(12) United States Patent
Rovekamp et al.

(10) Patent No.: US 12,011,405 B1
(45) Date of Patent: *Jun. 18, 2024

(54) WEARABLE ROBOTIC UPPER BODY GARMENT

(71) Applicant: The United States of America as represented by the Administrator of the NASA, Washington, DC (US)

(72) Inventors: Roger Rovekamp, Kemah, TX (US); Christopher Beck, Houston, TX (US); Craig Cornwall, Boise, ID (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 285 days.

This patent is subject to a terminal disclaimer.

(21) Appl. No.: 17/319,198

(22) Filed: May 13, 2021

Related U.S. Application Data

(63) Continuation of application No. 15/956,986, filed on Apr. 19, 2018, now Pat. No. 11,026,859.

(60) Provisional application No. 62/487,986, filed on Apr. 20, 2017.

(51) Int. Cl.
    *A61H 1/02* (2006.01)
    *A41D 1/00* (2018.01)
    *B25J 9/00* (2006.01)

(52) U.S. Cl.
    CPC ........... *A61H 1/0281* (2013.01); *A41D 1/002* (2013.01); *B25J 9/0006* (2013.01); *A61H 2201/1614* (2013.01); *A61H 2201/1635* (2013.01); *A61H 2201/165* (2013.01); *A61H 2201/1671* (2013.01); *A61H 2205/062* (2013.01)

(58) Field of Classification Search
CPC ........................... A61H 1/0274; A61H 1/0281
See application file for complete search history.

(56) References Cited

U.S. PATENT DOCUMENTS

| | | | |
|---|---|---|---|
| 8,409,118 B2 | 4/2013 | Agrawal et al. |
| 8,968,220 B2 | 3/2015 | Han et al. |
| 10,596,059 B2 | 3/2020 | Angold et al. |
| 2003/0223844 A1 | 12/2003 | Schiele et al. |
| 2006/0161220 A1 | 7/2006 | Kobayashi et al. |
| 2007/0123997 A1 | 5/2007 | Herr et al. |
| 2010/0063601 A1 | 3/2010 | Sankai |

(Continued)

*Primary Examiner* — LaToya M Louis
(74) *Attorney, Agent, or Firm* — David G. Matthews; Edward K. Fein

(57) ABSTRACT

A system and method is provided for a wearable robotic upper body garment. In an embodiment, an upper body garment or apparatus comprises a shoulder saddle, one or more actuators, one or more flexible tendons, back torso section, front, torso section, torso wrap, and upper arm cuff. The shoulder saddle may be comprised of a yoke and one or more elevated shoulder sections. The one or more elevated shoulder sections may be comprised of a first elevated shoulder section. In an embodiment, the back torso and front torso sections may be structurally connected to the yoke. In an embodiment, the one or more actuators may be structurally connected to either said back torso section or front torso section. In an embodiment, the one or more flexible tendons may be operationally connected to a predetermined one or more actuators and an upper arm cuff. In an embodiment and during operations, the one or more actuators effectuate a pulling motion on one or more flexible tendons enabling or augmenting movement about an upper extremity joint.

10 Claims, 7 Drawing Sheets

(56) References Cited

U.S. PATENT DOCUMENTS

2014/0277739 A1 9/2014 Kornbluh et al.
2015/0173993 A1 6/2015 Walsh et al.
2016/0206497 A1 7/2016 Deshpande et al.

WEARABLE ROBOTIC UPPER BODY GARMENT

CROSS-REFERENCE TO RELATED APPLICATIONS

This application is a continuation of U.S. patent application Ser. No. 15/956,986 filed on Apr. 19, 2018, which claims priority to and the benefit of U.S. Provisional Application Ser. No. 62/487,986 filed on Apr. 20, 2017, the entire contents of which are hereby incorporated by reference.

ORIGIN OF THE INVENTION

The invention described herein was made pursuant to research, development, or exploration work under a contract with the National Aeronautics and Space Administration. The invention may be manufactured and used by or for the Government of the United States of America for governmental purposes without the payment of any royalties thereon or therefor.

BACKGROUND

A wearable robotic upper body garment could benefit humans who, for example, suffer from physical disabilities or engage in activities that involve load carrying or manipulation.

Regarding physical disabilities, traumatic brain injury (TBI) is a condition that has left approximately 5.3 million Americans with a long-term disability. Strokes are also a common cause for upper limb movement disorders; over half a million Americans experience their first stroke every year. Task-specific and intensive practice could significantly improve motor recovery and induce neuroplasticity after brain injury. The greater effectiveness of intensive task-specific practice relative to standard therapy techniques suggests that repetitive motor practice is a crucial rehabilitation component and provides a key opportunity for the introduction of robotics in rehabilitation. Achieving voluntary isolated movements after neurological injuries such as TBI and strokes are common therapy goals. Synergistic movement patterns that occur after neurological injuries have the potential to interfere with activities of daily living (ADLs) and limit functional independence of the individual. A common rehabilitation approach to address unwanted synergies includes manual fixation of undesired movements and facilitation of desired movements.

Robotic appliances used in upper extremity rehabilitation can provide different types of movement and motion support such as active, passive, haptic, and others. Robotic applications are generally active in nature because these applications generally rely on one or more actuators thereby enhancing, augmenting, or producing movement of the upper extremity. The trend of applying robotics to address these rehabilitation challenges continues to grow. Upper extremity rehabilitation is comprised of actions and movements that have the potential to induce the individual to re-learn movements; upper extremity assistance is comprised of actions and movements that simulate a human user's independence and quality of life. Existing robotic devices that provide the capability to actuate the affected proximal upper extremities for rehabilitative or assistive purposes, however, are generally ground-based and not wearable and portable. Wearable robotic devices offer additional potential advantages, including allowing more task-oriented therapy (i.e. performing functional tasks as opposed to merely prescribed motions that are somewhat decoupled from practical ADLs), and bringing therapy to new venues including the home. Additional considerations include practical considerations such as relatively easy and fast set-up times and economic considerations such as a reasonable price.

Regarding activities that involve load carrying or manipulation, means for amplifying the ability for a user to manipulate increased load or loads for a greater amount of time may lessen the likelihood of injury, improve efficiency of operations, and achieve tasks that were previously unachievable due to human strength or endurance limitations.

A first type of robotic appliance is designed for rehabilitation, for assistance, or to amplify the ability for a user to manipulate increased load/loads for a greater amount of time and may comprise a mechanical structure that mirrors the skeletal structure of a limb including a limb's joint(s). Stated otherwise, the first type of robotic appliance may comprise a mechanical or artificial joint. In direct contrast, a second type of robotic appliance is generally known in the art as not including artificial, mechanical joints. Rather, this second type of robotic appliance is generally known in the art to contact a human user's limb in predetermined proximal and distal locations while utilizing the human user's joints for movement and motion.

The mechanical structure of prior art designs for upper extremity robotic devices is generally based on either static test articles or devices that may be considered fully rigid devices. Static test articles and fully rigid devices are not portable or practical for being worn by a human user. Stated otherwise, static test articles and fully rigid devices are incapable of applying loads to a human user in such a way to provide beneficial functionality in a portable means without prohibitive discomfort for the human user. Additionally, prior art designs for upper extremity robotic devices include mostly ground-based systems wherein these systems rely on shunting loads into some type of ground-based structure such as, for example, a ceiling, floor, or wall. Comparably, a device that may be considered fully flexible would generally not be controllable and effective for increasing load capacity and manipulation. Prior art wearable appliances generally rely on materials that are "non-stretch" in tension. These appliances are designed to account for applied forces in tension and not in compression. For a wearable robotic upper body garment, proper handling of applied loads is desirable, due to balancing the objectives of user comfort and operational control. There exists a need for a device that combines general flexibility as well as selective local and directional stiffness or rigidity to effectively increase load capacity and manipulation for a human user in a wearable and portable manner.

SUMMARY

The following summary introduces some aspects of the invention as a prelude to the more detailed description that is presented later, but is intended to neither define nor delineate the scope of the invention.

A wearable robotic upper body garment that strikes a balance between comfort for the user and operational effectiveness is generally desired and one or more embodiments are herein disclosed. A user's comfort may be enhanced with materials and components that are relatively soft and flexible as well as maintaining a degree of rigidity capable to counter loads applied to a limb and torso in order to implement joint motion.

The wearable robotic upper body garment is an active device in that it is capable of moving or assisting the movement of a human user's limbs and may be comprised of active actuators. The wearable robotic upper body garment is capable of effectively distributing loads away from the human user's shoulder areas and around the human user's torso as well as minimizing pressure points and interface migration, which is generally desirable. One or more embodiments of a wearable robotic upper body garment is described below wherein the one or more embodiments may be capable of providing directional stiffness through the use of a predetermined geometry and predetermined materials to make the garment stiff or rigid in certain locations and directions as well as flexible in other locations and directions.

The one or more embodiments of the wearable robotic upper body garment described below may be capable of actively controlling a human user's upper extremity such as for example a predetermined right or left shoulder and associated right or left elbow of a human user (or both right and left shoulder and right and left elbow). Such active control may be at least partially implemented by positioning a predetermined right or left arm in specific orientations and commanding movement and applied force(s) on a right arm, left arm, or both through desired motion (e.g., preprogrammed motion). The one or more embodiments of the wearable robotic upper body garment described herein uses a predetermined amount of semi-rigid or rigid components (to the minimal amount practicable) and force-controllable actuators. The wearable robotic upper body garment may be distinguished from a robotic appliance that is comprised of a mechanical or artificial joint. The wearable robotic upper body garment may be distinguished from a robotic appliance that relies on applied loads to be directed into an immovable structure, for example into a wall, the ceiling, or the floor.

DETAILED DESCRIPTION OF THE INVENTION

Figure 1:
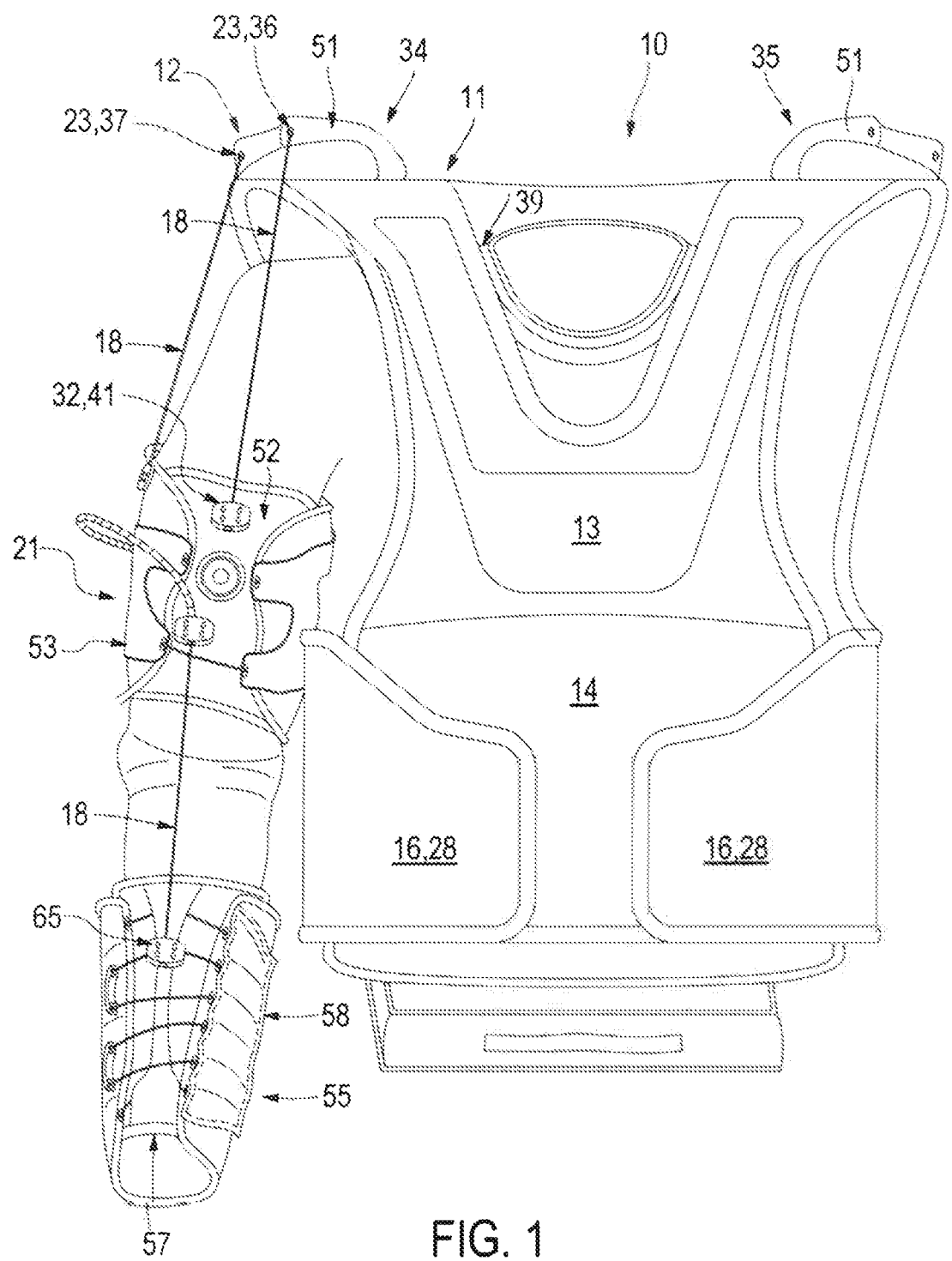
FIG. 1 is a front perspective view of an embodiment of a wearable robotic upper body garment.

With initial reference to FIG. 1, a first embodiment of a wearable robotic upper body garment (10) will now be described in additional detail. In an embodiment, the wearable robotic upper body garment (10) is not a ground-based system and does not rely on shunting loads into some type of ground-based structure such as, for example, a ceiling, floor, or wall. As illustrated in FIG. 1, a wearable robotic upper body garment (10) may be comprised of a shoulder saddle (11) wherein the shoulder saddle (11) may be comprised of one or more elevated shoulder sections (12) and a yoke (13). In an embodiment, the shoulder saddle (11) is not a ground-based system and does not rely on shunting loads into some type of ground-based structure such as, for example, a ceiling, floor, or wall. The yoke (13) may be comprised of a semi-rigid to rigid material that may be manufactured to be selectively stiff in different and multiple directions such as, for example, a carbon-fiber material, thin plastic such as e.g., ARMALON, fiberglass, or the like. The anterior facing side of the yoke (13) may be a generally V-shape comprising an open area for a human user's head to fit through wherein the anterior facing side of the yoke (13) may form a V-like shape. In an embodiment, the yoke's upper area may be wider as compared to the yoke's lower area. This particular design enhances the yoke's capability to distribute forces/loads away from a user's shoulder region and towards (to) the user's torso region. The one or more elevated shoulder sections (12) may be structurally interconnected with the yoke (13) in a seamless or semi-seamless manner. The yoke (13) may be capable of allowing flexibility in a predetermined first direction and resisting flexibility in a predetermined second direction thereby in combination with a front torso section (14), back torso section (15), and torso wrap (15) capable of transferring loads away from the shoulder region to the torso region. In an embodiment, the front torso section (14), back torso section (15), and torso wrap (15) are not ground-based systems and do not rely on shunting loads into some type of around-based structure such as, for example, a ceiling, floor, or wall. In operations, the shoulder saddle (10) may be placed over the neck of a human user wherein the one or more elevated shoulder sections (12) may be comprised of a semi-rigid to rigid material such as carbon-fiber material (for example, carbon-fiber wrapped plastic), fiberglass, sheet metal, or the like. The one or more elevated shoulder sections (12) may be capable of transferring forces away from the human user's shoulder as will be discussed in more detail below. As will also be described in more detail below, the one or more elevated shoulder sections (12) in combination with the yoke (13) may be capable of transferring forces away from the human user's shoulder and distributing forces towards or into the human user's torso.

Figure 2:
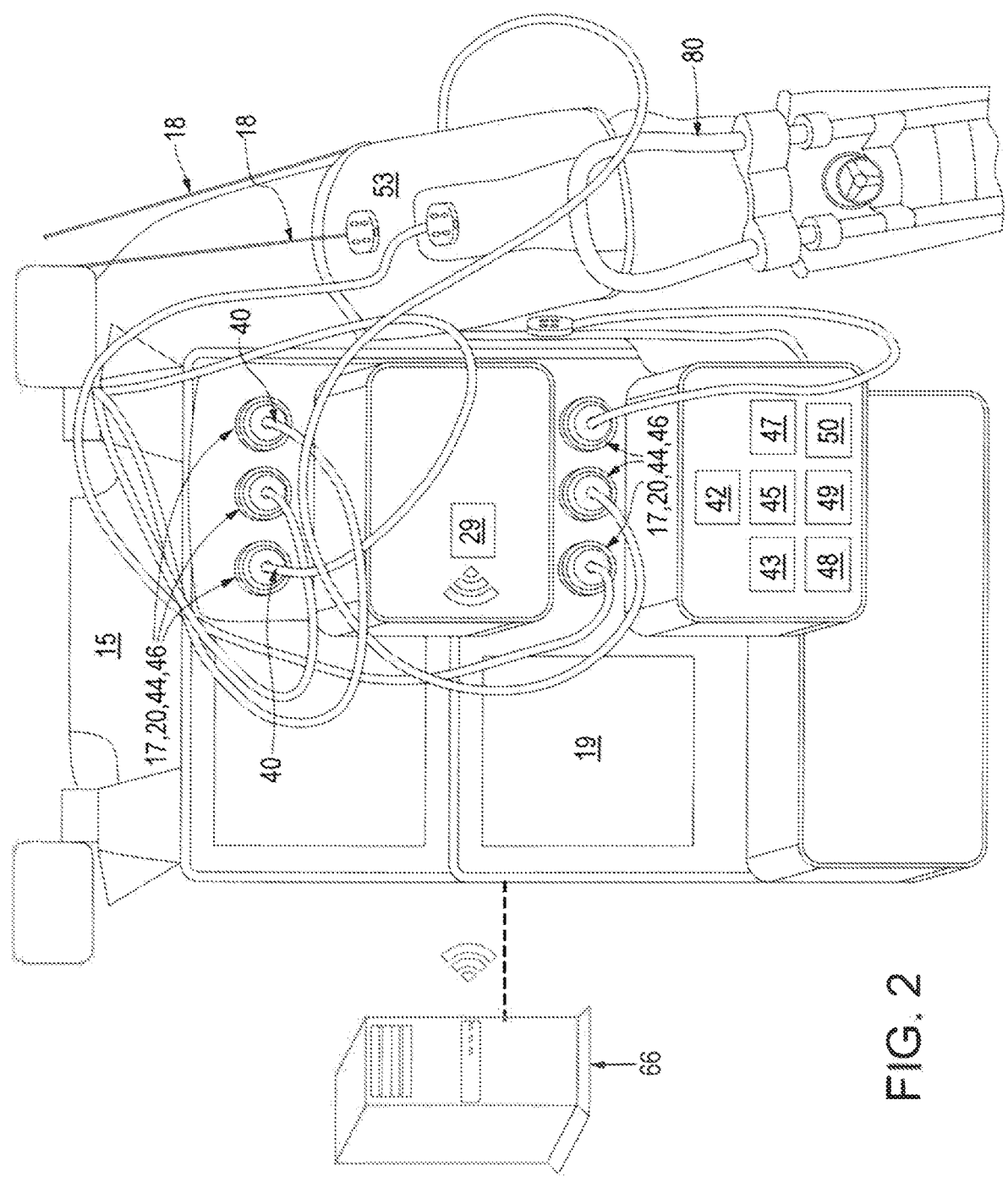
FIG. 2 is a rear perspective view of an embodiment of a wearable robotic upper body garment.

With particular reference to FIGS. 1 and 2, an embodiment of the wearable robotic upper body garment (10) will now be more fully described. The wearable robotic upper body garment (10) may be further comprised of a front torso section (14) and a back torso section (15). The front torso section (14) and back torso section (15) may be comprised of semi-flexible to flexible material such as non-stretch and layered fabrics, carbon-fiber material (e.g., carbon-fiber wrapped plastic), fiberglass, sheet metal, plastic such as e.g., ARMALON, or the like. The front torso section (14) and back torso section (15) may be, for example, a flap, tab, apron, etc. The yoke (13) may be structurally connected or attached to the front torso section (14), the back torso section (15), or both. In an embodiment, a torso wrap (16) (aka a ribcage wrap) may be structurally connected or attached to the back torso section (15) wherein the torso wrap (16) may be comprised of two or more components (28). In another embodiment, a torso wrap (16) may be structurally integrated with the back torso section (15) comprising one continuous section of material or compliant material such as, for example, fabric with semi-rigid or rigid elements assimilated into the integrated torso wrap (15) and back torso section (15) in one or more layers. The torso wrap (16) may be comprised of semi-flexible to flexible material such as, for example, non-stretch and layered fabrics, carbon-fiber material (e.g., carbon-fiber wrapped plastic), fiberglass, sheet metal, or the like. The two or more components (28) may be structurally connected to each other, to the front torso section (14), to the back torso section (15), or any combination such as by semi-rigid or rigid means as well as by means of VELCRO® or the like or in any combination. As an example and in an embodiment, when the torso wrap's (16) two or more components (28) are temporarily and structurally connected to each other and/or to the front torso section (14), the torso wrap (16) in combination with the front torso section (14) and the back torso section (15) as well as the yoke (13) are capable of transferring forces away from the human user's shoulder and distributing forces into or to the human user's torso. The capability of transferring forces away from the human user's shoulder and distributing forces into the human user's torso may be based on ergonomic desires or needs and specifically, a human user's comfort.

With continued reference to FIGS. 1 and 2, one or more actuators (17) may be each comprised of one or more motors (20). Additionally, the one or more actuators (17) may be each further comprised of one or more pulleys (73). The type of actuator may be selected based on a particular set of requirements. The one or more actuators (17) may be, for example, electric actuators, hydraulic actuators, pneumatic actuators, series elastic actuators, or any combination. In an embodiment, one or more base units (19) may be incorporated or utilized to structurally support the one or more actuators (17). In an embodiment, the one or more actuators (17) are structurally connected to one or more base units (19). Additionally, each base unit (19) may be structurally connected or attached to the back torso section (15), the front torso section (14), or any combination, away from the human user's limbs. In an embodiment, the one or more base units (19) are not ground-based systems and do not rely on shunting loads into some type of ground-based structure such as, for example, a ceiling, floor, or wall. Additionally, one or more flexible tendons (18) may be operationally connected or in operational relationship to a predetermined one or more actuators (17), one or more motors (20), one or more pulleys (73), or any combination. In an embodiment, the one or more flexible tendons are operationally connected to a predetermined one or more actuators (17), one or more motors (20), one or more pulleys (73), or any combination at the one or more tendons' (20) proximal ends (40).

With continued reference to FIGS. 1 and 2, a predetermined number of the one or more flexible tendons (18) operationally associated with each actuator (17), motor (20), pulley (73), or any combination may be routed through or around a predetermined one or more elevated shoulder sections (12) and torso wrap (16) at predetermined locations (23). In an embodiment, a predetermined one or more flexible tendons (18) is in operational relationship to a predetermined one or more pulley (73) wherein the motor (20) may impart a pulling motion on the predetermined one or more flexible tendon (18) and therein spin the predetermined one or more pulley (73). In another embodiment, a predetermined one or more flexible tendon (18) is operationally connected to a predetermined one or more pulley (73) wherein the motor (20) is operationally connected to the predetermined one or more pulley (73). In this particular embodiment, the motor (20) may spin the predetermined one or more pulley (73) thereby imparting a pulling motion on the predetermined one or more flexible tendon (18). Additionally, a predetermined number of the one or more flexible tendons (18) operationally associated with each actuator (17), motor (20), pulley (73), or any combination may be routed through or around a predetermined location on the torso wrap (16), back torso section (15), front torso section (14), or any combination. In an embodiment, the means for routing (67) through or around a predetermined one of the one or more elevated shoulder sections (12) at predetermined locations (23) may be accomplished by one or more conduits (24), one or more eyelets, one or more second pulleys, etc. In an embodiment, one or more conduits (24) may comprise a first conduit (36), second conduit (37), third conduit (38), fourth conduit (70), or any combination. In an embodiment, the first, second, and third conduits (36,37,38) may be located on one of the one or more elevated shoulder sections (12) and the fourth conduit (70) may be located on the torso wrap (16).

With continued reference to FIGS. 1 and 2, the wearable robotic upper body garment (10) may be further comprised of one or more upper arm cuffs (aka biceps cuffs) (21). The one or more upper arm cuffs (21) may be temporarily attached to a predetermined upper arm region (22) of the human user. In an embodiment, the one or more upper arm cuffs (21) are not ground-based systems and do not rely on shunting loads into some type of ground-based structure such as, for example, a ceiling, floor, or wall. The one or more upper arm cuffs (21) may be comprised of a combination of semi-flexible to flexible materials as well as semi-rigid to rigid materials such as, for example, non-stretch and layered fabrics, carbon-fiber material (e.g., carbon-fiber wrapped plastic), fiberglass, sheet metal, or the like. The proximal end (40) of each flexible tendon (18) may be operationally connected or attached to one of the one or more actuators' (17) one or more motors (20) or one or more pulleys (73). In an embodiment, a flexible tendon (18) may be in operational relationship with an upper arm cuff (21). In an embodiment, the distal end (41) of each flexible tendon may be operationally and/or structurally connected or attached to a predetermined location on one of the one or more upper arm cuffs (21) at a first termination point (32). In another embodiment, the distal end (41) of each flexible tendon (18) may be routed through a predetermined location on one of the one or more upper arm cuffs (21) and attached to a predetermined location on a predetermined one or more lower arm cuffs (55) at a second termination point (65). Whether the distal end (41) of a predetermined flexible tendon (18) is operationally or structurally connected to an upper arm cuff (21) or routed through an upper arm cuff (21), the flexible tendon (18) is considered to be in operational relationship with the upper arm cuff (21). In an embodiment, the one or more first termination points (32) and second termination points (65) may be integrated on the one or more upper arm cuffs (21) and one or more lower arm cuffs (55), respectively, and may be constructed of plastic or metal hardware or the like. The one or more upper arm cuffs (21) and one or more lower arm cuffs (55) may be semi-rigid or rigid in the axial and radial directions to mitigate the migration or relative deflection of the one or more first and second termination points (32,65). A service unit (29) may also be further comprised of an electronics subsystem (42), software (43), one or more sensors (44), and a power supply (45) such as, for example, a battery (46). The service unit (29) may be structurally connected or installed on the front torso section (14) or back torso section (15). The service unit (29) may be structurally connected to or in proximal spatial relationship with a base unit (19), front torso section (14), or back torso section (15). With respect to the one or more sensors (44), the one or more sensors (44) may be comprised of one or more force sensors (46) capable of operating the one or more actuators (17) for purposes of force control and impedance control of one or both of the human user's arms. In an embodiment, the one or more force sensors (46) may be located in proximate spatial relationship to the one or more actuators (17) or one or more motors (20). The employment of one or more force sensors (46) enable(s) increased control of the human user's one or more arms due to, in part, heightened reception of external forces from the human user. The combination of the one or more force sensors (46), the one or more actuators (17), electronics subsystem (42), and software (43) may enable enhanced maintenance of commanded joint angles even in the presence of applied forces from the human user, which may be preferred for a synergistic feel between the wearable robotic upper body garment (10) and the human user, as a natural spring-damper feel may be programmed. With respect to the electronics subsystem (42), the electronics subsystem (42) may be comprised of a processor (47) wherein the processor (47) may be comprised of a computer. The electronics subsystem (42) may be further comprised of a power distribution subsystem (48) and an electronics pack (49). The electronics pack (49) may be comprised of one or more motor drivers (50).

Figure 3:
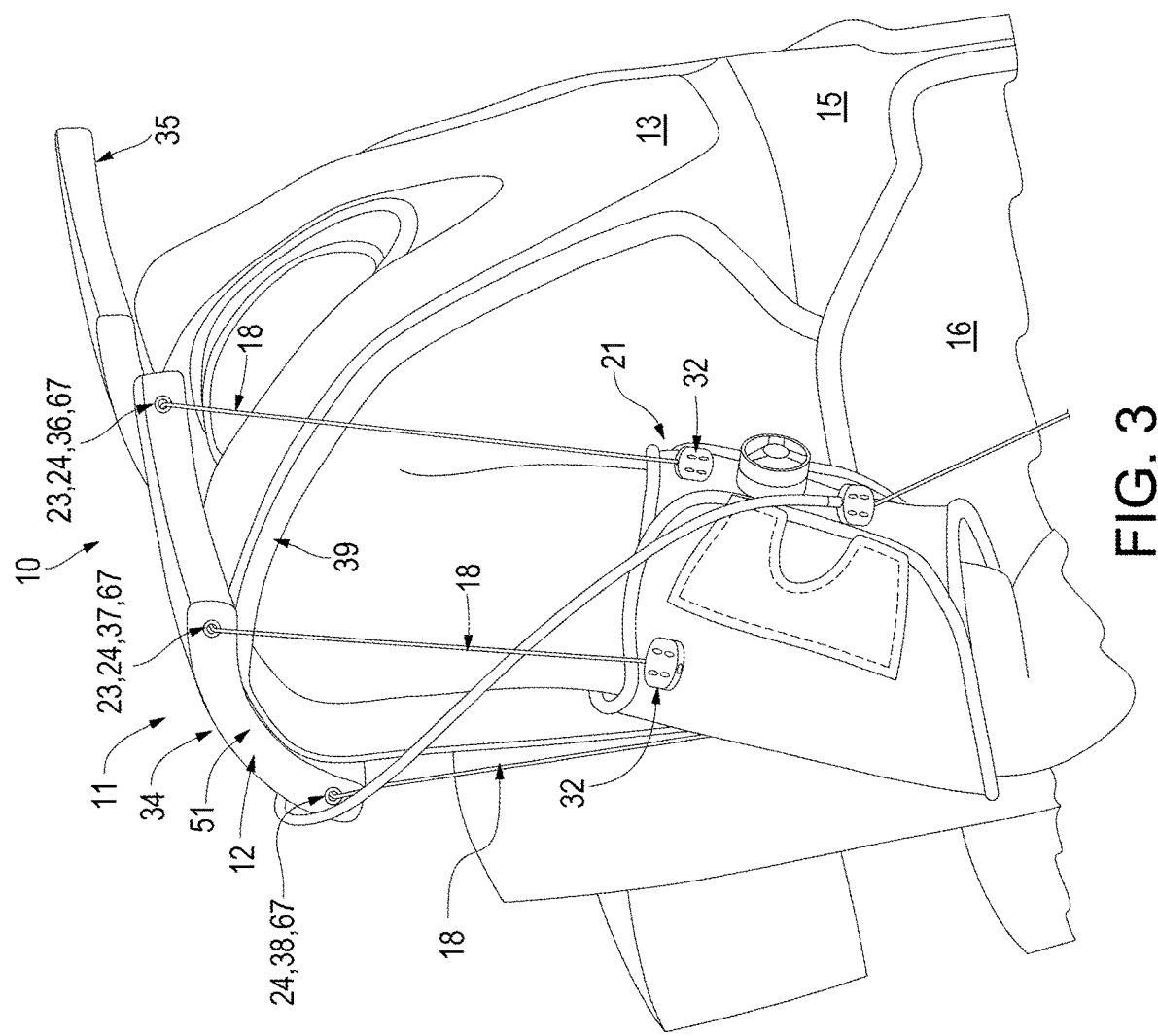
FIG. 3 is a perspective view of a shoulder saddle.

With particular reference to FIG. 3, an embodiment of a shoulder saddle (11) will now be more fully described. The shoulder saddle (11) may be comprised of one or more elevated shoulder sections (12) and a yoke (13). In an embodiment, the shoulder saddle (11) may be comprised of a right and left elevated shoulder section (34,35). FIG. 3 illustrates a right elevated shoulder section (34). The yoke (13) may be comprised of a semi-rigid to rigid material such as, for example, a carbon-fiber material (for example, carbon-fiber wrapped plastic), fiberglass, plastic, sheet metal, or the like. The one or more elevated shoulder sections (12) may be structurally connected to the yoke (13). In an embodiment, the one or more elevated shoulder sections (12) may be interconnected with the yoke (13) to form a single structural component. In an embodiment, the one or more elevated shoulder sections (12) may be semi-rigidly or rigidly connected to the yoke (13). Each of the one or more elevated shoulder sections may be comprised of a shoulder rest (39) and one or more extension portions (51) wherein the shoulder rest (39) and one or more extension portions (51) may be interconnected to form a single structural component. The shoulder rest (39) may be shaped in a predetermined shape. In an embodiment, a predetermined shape may conform to one or more human users' shoulder area. Each or a predetermined number of the one or more extension portions (51) may be cantilevered in design. The cantilevered design of the extension portions (51) may be capable of locating the one or more flexible tendons (18) a predetermined distance away from a human user's arm for purposes of avoiding or mitigating contact of the one or more flexible tendons (18) with the human user's arm. During operations, the one or more flexible tendons (18) apply forces to the shoulder saddle (11) wherein the applied forces are a consequence of a predetermined actuator/motor's operation. The combination of the shoulder rest (39) and one or more extension portions (51) may be capable of distributing applied forces away from the human user's shoulder area as well as increasing an associated moment arm (aka lever arm) for a predetermined one or more flexible tendons (18). Further, the combination of the shoulder saddle (11), the yoke (13), the front torso section (14), the back torso section (15), and the torso wrap (16) serves to distribute applied forces away from the human user's shoulder area and towards or to the human user's torso area. The one or more flexible tendons (18) may be routed from the one or more motors (20) or pulleys (73) attached to the back torso section (15) or front torso section (14) wherein the routed path includes routing around or through a predetermined elevated shoulder section (12) or the front torso section (14), back torso section (15), or torso wrap (16). As illustrated in FIG. 3, the means for routing (67) through or around a predetermined one of the one or more elevated shoulder sections (12) and torso wrap (16) at predetermined locations (23) may be accomplished by one or more conduits (24) encapsulated within the one or more shoulder sections (12) and torso wrap (16). The number and location of the one or more conduits (24) may be predetermined based on the unique requirements of an application of a particular embodiment of the wearable robotic upper body garment (10). As illustrated in FIG. 3, in an embodiment, a first, second, and third conduit (36,37,38) may be located on the right elevated shoulder section (34). The first conduit (36) may be located on the anterior portion of the elevated shoulder section (34). The third conduit (38) may be located on the posterior portion of the elevated shoulder section (34). The second conduit (37) may be located at or near the right side or right lateral facing side of the elevated shoulder section (34). The one or more flexible tendons (18) may actuate by "pulling" and not "pushing." The proximal end (40) of each of the one or more flexible tendons (18) may be operationally connected or attached to a predetermined one or more actuators (17), motors (20), or pulleys (73). In an embodiment, the one or more first termination points (32) serve as attachment points for the distal ends (41) of an associated one or more flexible tendons (18). In an embodiment, the one or more first termination points (32) may be located on a predetermined upper arm cuff (21), which will be more fully discussed below. The shoulder saddle (11) may be further comprised of an integrated shoulder retraction system (33). The integrated shoulder retraction system (33) provides a means for retracting the shoulders to allow for movements that may be more beneficial to rehabilitation, assistance, or augmentation, and to constrain scapular movement.

Figure 4:
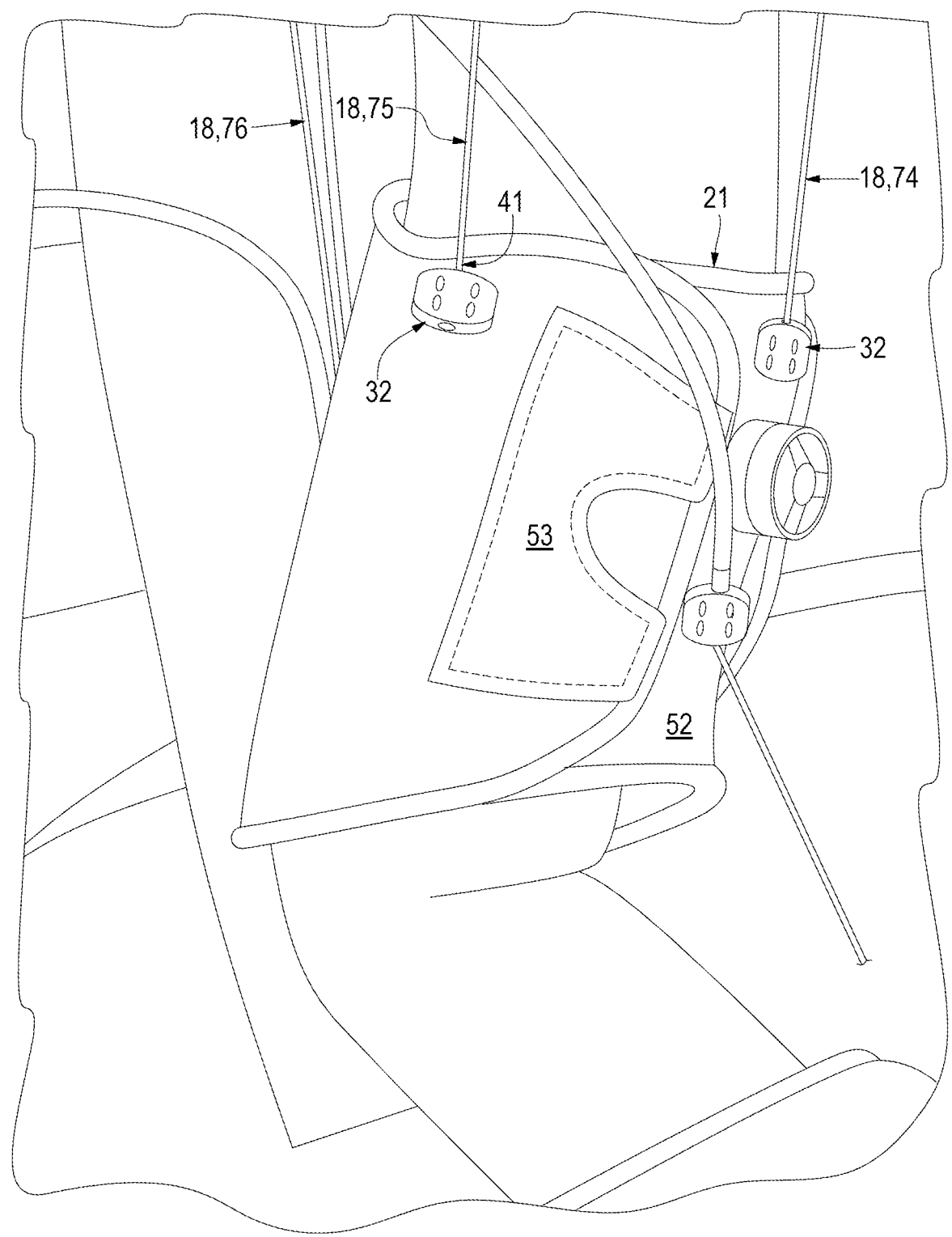
FIG. 4 is a perspective view of an upper arm cuff.

With particular reference to FIG. 4, an embodiment of an upper arm cuff (21) will be more fully described. In an embodiment, the one or more upper arm cuffs (21) are not ground-based systems and do not rely on shunting loads into some type of ground-based structure such as, for example, a ceiling, floor, or wall. Each of the one or more upper arm cuffs (aka biceps cuffs) (21) may be comprised of an anterior section (52) and a posterior section (53). The anterior section (52) and posterior section (53) may be donned by the human user and temporarily attached to each other in a semi-rigid or rigid manner. The means for temporarily attaching the anterior section (52) and posterior section (53) of an upper arm cuff may be comprised of a combination of male and female clips, integrated wire laces, ratchet mechanisms, or any combination. In an embodiment, a predetermined one or more flexible tendons' (18) distal end (41) may terminate at a predetermined location on an upper arm cuff (21). Upper arm cuff (21) tendon one or more first termination points (32) may be determined by constructing the tendon vectors necessary for adequate control in the desired degrees of freedom. For example, for control about a DOF, there may be a requirement for a first tendon vector to effectuate motion (e.g., rotation about a predetermined joint) in a first direction, and a second tendon vector that causes rotation in the opposite direction. In an embodiment, a first flexible tendon (74) routed through a first conduit (36) may terminate at a first predetermined first termination point (32) located in the anterior region of an upper arm cuff (21). Additionally, a second flexible tendon (75) routed through a second conduit (37) may terminate at a second predetermined first termination point (32) located in the lateral region of an upper arm cuff (21). Still further, a third flexible tendon (76) routed through a third conduit (38) may terminate at a third predetermined first termination point (32) in the posterior region of an upper arm cuff (21). Finally, a fourth flexible tendon (77) routed through a fourth conduit (70) may terminate at a fourth predetermined first termination point (32) located in the medial region of an upper arm cuff (21). The combination of the first and third flexible tendons in this embodiment may effectuate, among others, shoulder flexion/extension movement and control, depending on current shoulder joint angles. The combination of the second and fourth flexible tendons (75,77) in this embodiment may effectuate, among others, shoulder abduction/adduction movement and control, depending on current shoulder joint angles. In another embodiment, the one or more flexible tendons (18) may be routed through a predetermined location on or around an upper arm cuff (21) wherein the one or more flexible tendons' (18) distal end (41) may terminate at a predetermined location on a lower arm cuff (55). In an embodiment, the overall shape formed by the anterior section (52) and posterior section (53) may be conical in nature. The generally conical shape may provide additional support during operations by utilizing the natural generally conical shape of a human user's arm to mitigate migration of an upper arm cuff (21) upwards towards a human user's shoulder as one or more flexible tendons (18) "pull" an upper arm cuff (21). The pulling motion of the one or more flexible tendons (18) is a consequence of operations or engagement of the one or more actuators' (17) one or more motors (20). In an embodiment, the one or more upper arm cuffs (21) are adjustable where the distal ends (41) of the one or more flexible tendons (18) may terminate on a predetermined location on an upper arm cuff (21).

Figure 5:
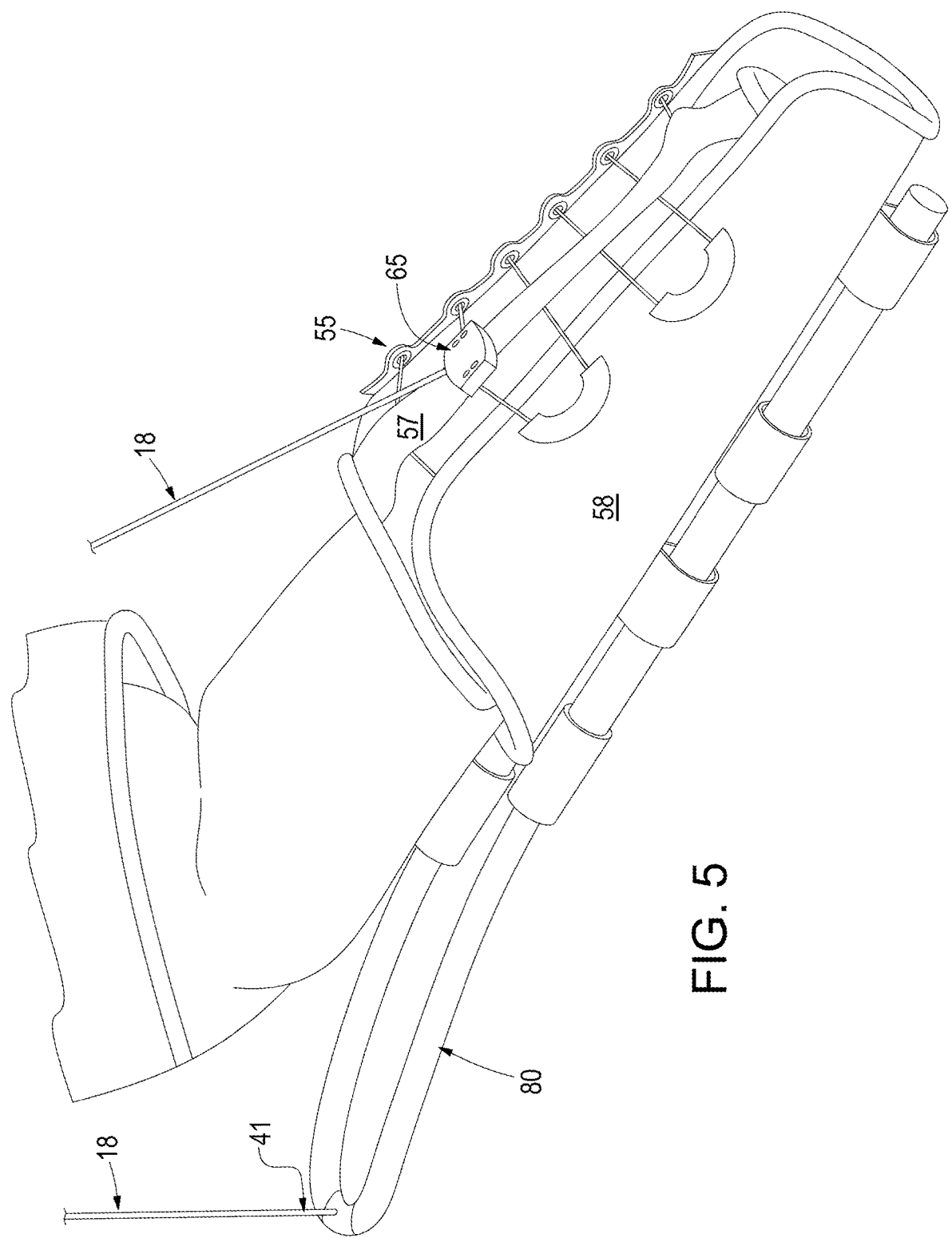
FIG. 5 is a perspective view of a lower arm cuff.

With particular reference to FIG. 5, an embodiment of a lower arm cuff (aka forearm cuff) (55) will be more fully described. In an embodiment, the one or more lower arm cuffs (55) are not ground-based system and do not rely on shunting loads into some type of ground-based structure such as, for example, a ceiling, floor, or wall. Each of the one or more lower arm cuffs (55) may be comprised of a front section (57) and back section (58). The front section (57) and back section (58) may be donned by the human user and temporarily attached to each other in a semi-rigid or rigid manner. In an embodiment, the overall shape of a lower arm cuff (55) formed by the front section (57) and back section (58) may be conical in nature. The generally conical shape may provide additional support during operations by utilizing the natural generally conical shape of a human user's lower arm to mitigate migration of a lower arm cuff (55) upwards towards a human user's elbow as one or more flexible tendons (18) "pull" a lower arm cuff (55). The front section (57), back section (58), or both may be comprised of semi-rigid straps (71) or webbing material (72) that are capable of resisting flexibility in tension but allowing for flexibility in compression. In an embodiment, a lower arm cuff (55) may be in operational relationship with an upper arm cuff (21) by means of these semi-rigid straps or webbing material across the approximate axis of elbow flexion/extension rotation so as not to impede such rotation. This embodiment leverages the natural cone shape of the lower arm as well as grounds the particular upper arm cuff (21), preventing the particular lower arm cuff (55) from moving proximally during tendon pulling (aka during actuator or motor operations). In another embodiment, a lower arm cuff (55) may be in operational relationship with an upper arm cuff (21) by means of a flexible tendon (18) routed through the upper arm cuff (21) and terminating at a second termination point (65) located on the lower arm cuff (55). The means for temporarily attaching the front section (57) and back section (58) of a lower arm cuff (55) may be comprised of a combination of male and female clips, integrated wire laces, ratchet mechanisms, or any combination. In an embodiment, an elbow extension bar (80) may be rigidly or semi-rigidly attached to the lower arm cuff (55) in a predetermined location such that the distal end (41) of one or more flexible tendons (18) may attach to the elbow extension bar (80), and impart elbow extension motion to the user when the flexible tendon is pulled by the motor (20), actuator (17), or pulley (73). The method of attachment of the elbow extension bar (80) to the lower arm cuff (55) may be through use of webbing, stitching, adhesive, fasteners, or the like. The elbow extension bar (80) may be adjustable, by sliding axially and circumferentially along the forearm, and may be able to lock in place, for example via a friction clamp, set screw, or the like. The elbow extension bar (80) may be rigid, constructed from materials such as carbon fiber-wrapped plastic, metal, or the like.

An embodiment for operation of the wearable robotic upper body garment (10) will now be described. The wearable robotic upper body garment (10) may be donned on the human user. In an embodiment, the step of donning includes placing the one or more shoulder rests (39) on a human user's shoulder area. In another embodiment, the step of donning includes locating the wearable robotic upper body garment (10) above the user's head, lowering the wearable robotic upper body garment (10) such that the one or more shoulder rests (39) contact the user's shoulder area(s), and structurally connecting the torso wrap (16) to the front torso section (14). After the wearable robotic upper body garment (10) is donned, an operator may interface the wearable robotic upper body garment's (10) processor (47) to an off-board computer (66). For purposes of rehabilitation (aka physical therapy), the operator may select a desired joint trajectory and speed for the human user (aka patient) to adhere to. The patient may have visual feedback of his/her real-time joint angle and the desired joint angles, allowing him/her to adjust his/her movement to match the desired trajectory. The operator can select how much resistance/assistance (and which direction) may be applied to the patient by any combination of the one or more actuators (17), one or more motors (20), and one or more flexible tendons (18) on a predetermined joint's predetermined one or more degrees of freedom, depending on a predetermined rehabilitation protocol. A predetermined rehabilitation protocol may allow at least one DOF of the human user's shoulder to be controlled in one position, while a predetermined elbow of the human user would be free to move in accordance with input from the human user. The foregoing allows for isolation of joint movements, which is a beneficial part of physical therapy. In an analogous mode, the wearable robotic upper body garment (10) may attempt to null out any errors between desired (e.g., programmed) and actual joint angles, which may simulate a spring-damper feel. In yet another mode, the wearable robotic upper body garment (10) simply follows a desired trajectory for each controlled degree-of-freedom simultaneously, allowing the human user to perform pre-programmed motions (e.g., motions that simulate activities of daily life) that he/she may not be able to perform without assistance. In an embodiment, the electronics subsystem (42) in combination with the software (43) provide a means for implementing one or more control modes. For example, in an active assist mode, the shoulder abduction and flexion as well as elbow flexion may be commanded either simultaneously by coordinated control or individually while holding a predetermined position and/or orientation with respect to other predetermined joints.

Additionally, for example, in a passive assist mode, the human user may freely move his/her arm(s) while the electronics subsystem (42) in combination with the software (43) provide a means for controlling a predetermined amount of torque to one or more predetermined shoulder and elbow degrees of freedom. In another embodiment, the wearable robotic upper body garment (10) may be comprised of one or more motion stops capable of allowing the human user or physical therapist to stop power to the one or more motors (20). The software (43) may continuously monitor for predetermined unsafe conditions and stop power to the one or more motors (20) upon finding such a predetermined unsafe condition.

Figure 6:
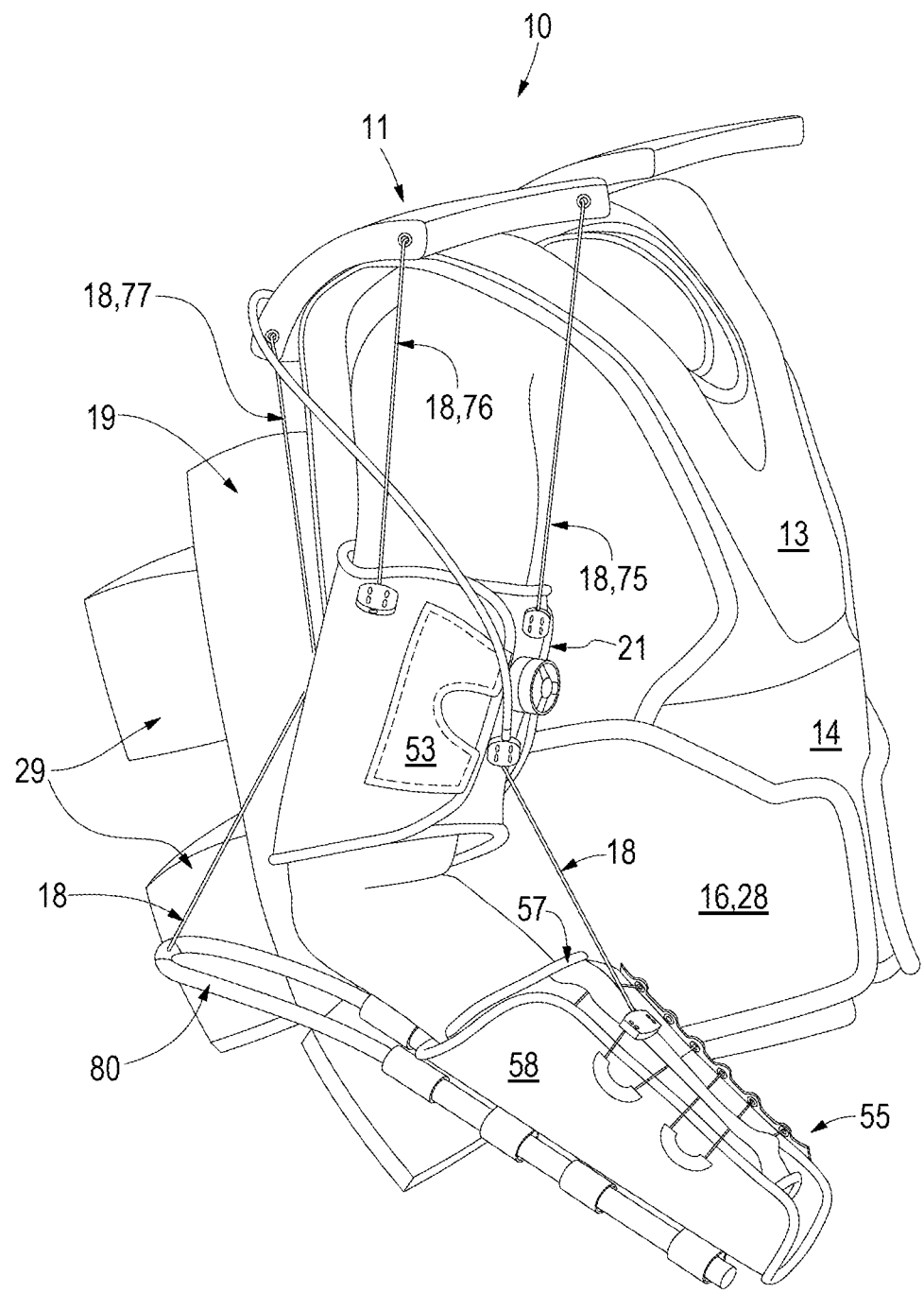
FIG. 6 is a perspective view of a shoulder saddle, upper arm cuff, and lower arm cuff.
Figure 7:
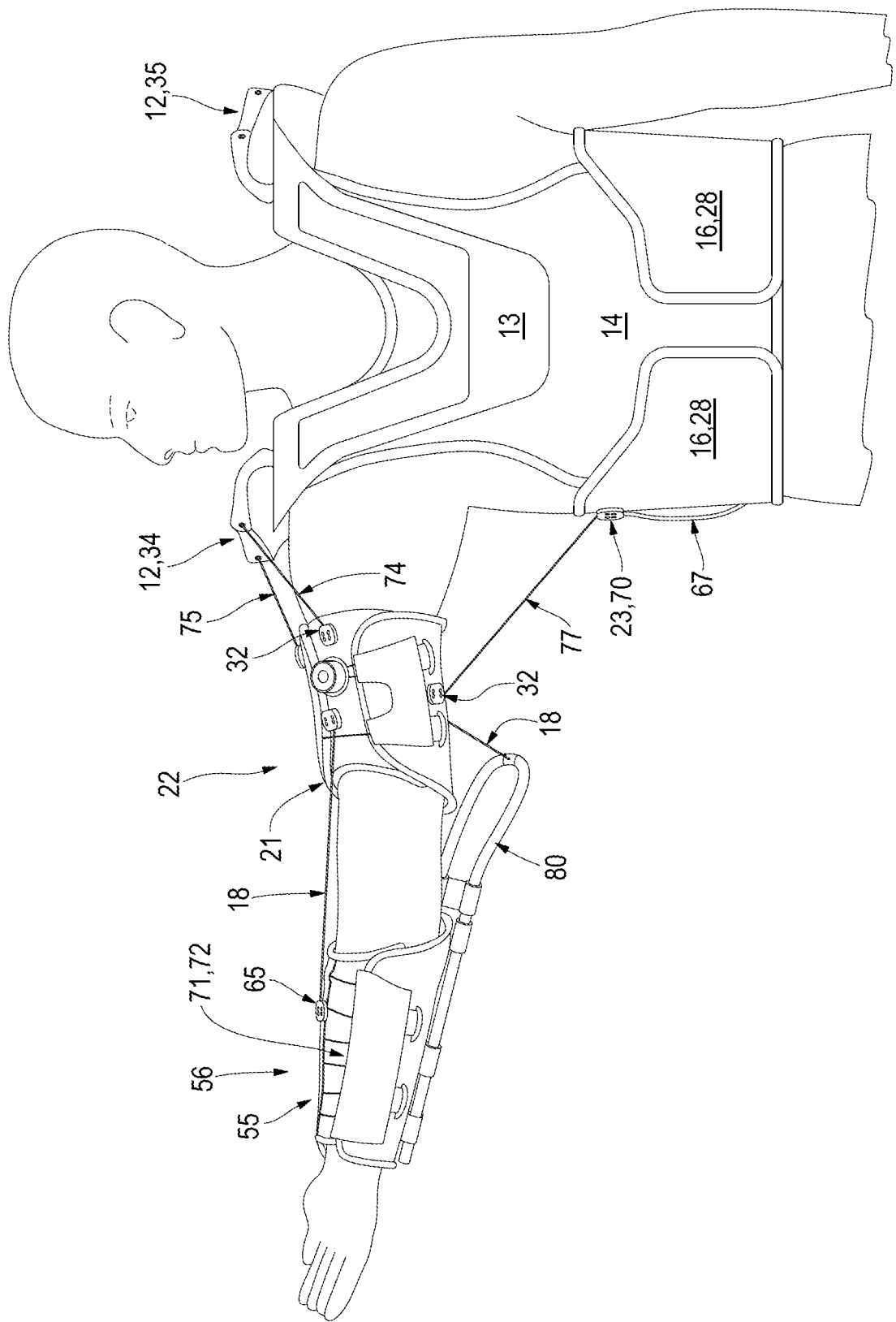
FIG. 7 is a perspective view of an embodiment of the shoulder saddle, yoke, front torso section, back torso section, and torso wrap donned on a human user.

Another embodiment for operation of the wearable robotic upper body garment (10) will now be more fully described. With particular reference to the embodiment illustrated in FIGS. 1, 2, and 6 one or more actuators (17) are structurally connected to a back torso section (15), away from a human user's arm when the wearable robotic upper body garment is donned by the human user. In an embodiment, as the one or more actuators' (17) one or more motors (20) operate or engage to pull the one or more flexible tendons (18), the one or more flexible tendons (18) assist the human user to move his/her arm about a predetermined joint (e.g., an elbow joint and/or a shoulder joint). Such movement amounts to active control of the user's arm or upper extremity. Further, the combination of the shoulder saddle (11) (comprised of the one or more elevated shoulder sections (12) and the yoke (13)), the front torso section (14), the back torso section (15), and the torso wrap (16) serves to distribute applied forces (as a consequence of operation of the one or more actuators' (17) one or more motors (20)) away from the human user's shoulder area(s) and towards (to) the human user's torso area. In an embodiment, force sensing by the one or more sensors (44) in operational relationship with the one or more actuators (17) may be employed to enable a predetermined amount of force feedback control and impedance control of the human user's arm. Such control may enable enhanced control of the human user's arm, reception of external forces (e.g., as initiated by the human user), and maintenance of commanded joint angles even in the presence of the external forces in a predetermined compliant fashion.

The foregoing descriptions, for purpose of explanation, have been described with reference to specific embodiments. However, the illustrative discussions above are not intended to be exhaustive or to limit the invention to the precise forms disclosed. Many modifications and variations are possible in view of the above teachings. Moreover, the order in which the steps and associated limitations of any methods described herein are illustrative in nature and may be re-arranged in multiple combinations. The embodiments were chosen and described to explain the principles of the invention and its practical applications, to thereby enable others skilled in the art to utilize the invention and various embodiments with various modifications as are suited to a particular contemplated use.

What is claimed is:

1. An upper-body apparatus comprising:
   a torso garment, the torso garment comprising:
      a torso wrap, wherein the torso wrap is configured to be wrapped around a torso of a user;
      a shoulder rest connected to the torso wrap and configured to contact a shoulder of a user; and
      a yoke connected to the torso wrap and configured to extend from the torso wrap to form an open area for a head of the user to fit through and having an elevated shoulder section disposed above the shoulder rest, wherein the elevated shoulder section and the shoulder rest are configured to elevate the elevated shoulder section above both the shoulder rest and the shoulder of the user to form a gap between the elevated shoulder section and both the shoulder rest and the shoulder of the user contacting the shoulder rest;
   one or more actuators, wherein each of the one or more actuators is comprised of one or more motors and the one or more motors includes a first motor;
   one or more flexible tendons operationally connected to a predetermined one of the one or more actuators, wherein said one or more flexible tendons is comprised of a first flexible tendon operationally connected to the first motor and routed through or around the elevated shoulder section at one or more predetermined locations;
   an upper arm cuff in operational relationship with the one or more flexible tendons, wherein the first flexible tendon extends from the elevated shoulder section to the upper arm cuff, and wherein the one or more flexible tendons are configured to effectuate shoulder movement of a user in response to the one or more actuators pulling the one or more flexible tendons to apply a force to the elevated shoulder section, and wherein the elevated shoulder section in combination with the yoke is configured to distribute the applied force away from the shoulder and towards the torso of the user;
   wherein the one or more flexible tendons include one or more proximal ends operationally connected to the one or more actuators;
   wherein the one or more flexible tendons include one or more distal ends;
   wherein at least one of the one or more flexible tendons is connected to one or more termination points on the upper arm cuff;
   one or more conduits configured to route at least one of the one or more flexible tendons from the one or more actuators to either the elevated shoulder section or the upper arm cuff;
   one or more base units structurally connected to the torso wrap and configured to structurally support the one or more actuators;
   wherein the one or more conduits includes one or more shoulder section conduits extending from the one or more actuators to the elevated shoulder section, wherein at least one of the one or more flexible tendons is routed with at least one of the shoulder section conduits from at least one of the one or more actuators and to the upper arm cuff;
   wherein the one or more conduits includes a torso wrap conduit extending from the one or more actuators to the torso wrap, wherein at least one of the one or more flexible tendons is routed with the torso wrap conduit from at least one of the one or more actuators and to the upper arm cuff;
   wherein at least one of the one or more flexible tendons extends from the one or more shoulder section conduits and to the upper arm cuff;
   wherein the one or more flexible tendons is further comprised of a second flexible tendon, the one or more actuators is further comprised of a second motor, and the one or more shoulder section conduits is comprised of a first shoulder section conduit and a second shoulder section conduit;

wherein said first flexible tendon is routed with the first shoulder section conduit from the first motor and through or around the first elevated shoulder section at a first predetermined position on the elevated shoulder section;

wherein the first flexible tendon is connected to said upper arm cuff at a first predetermined termination point;

wherein said second flexible tendon is operationally connected to said second motor and routed with the second shoulder section conduit from the second motor and through or around said first elevated shoulder section at a second predetermined position on the elevated shoulder section;

wherein the second flexible tendon is connected to said upper arm cuff at a second predetermined termination point;

wherein the one or more flexible tendons is further comprised of a third flexible tendon and a fourth flexible tendon, the one or more actuators is further comprised of a third motor and a fourth motor, and the one or more shoulder section conduits is further comprised of a third shoulder section conduit;

wherein the third flexible tendon is routed with the first shoulder section conduit from the third motor and through or around the elevated shoulder section at a third predetermined position on the elevated shoulder section;

wherein the third flexible tendon is connected to said upper arm cuff at a third predetermined termination point;

wherein the fourth flexible tendon is routed with the torso wrap conduit from the fourth motor and at a fourth predetermined position on the torso wrap; and wherein the fourth flexible tendon is connected to the upper arm cuff at a fourth predetermined termination point.

2. The upper-body apparatus of claim 1, wherein said first flexible tendon and said third flexible tendon are configured in combination to move a shoulder of said user of the upper body apparatus in a shoulder flexion movement and a shoulder extension movement.

3. The upper-body apparatus of claim 2, wherein the second flexible tendon and the fourth flexible tendon are configured in combination to move the shoulder of the user of the upper body apparatus in a shoulder abduction movement and a shoulder adduction movement.

4. The upper-body apparatus of claim 1, wherein the one or more flexible tendons further comprises a lower cuff flexible tendon;

wherein the one or more predetermined locations includes a routing predetermined location on the upper arm cuff;

wherein the lower cuff flexible tendon is routed from one of the one or more actuators through or around said upper arm cuff at the routing predetermined location and to a lower arm cuff termination point on the lower arm cuff; and wherein the lower cuff flexible tendon is connected to said lower arm cuff at a lower cuff termination point.

5. The upper-body apparatus of claim 4, wherein the torso wrap has a back torso section connected to the yoke and a front torso section connected to the yoke;

further comprising one or more base units structurally connected to either the back torso section or the front torso section and configured to structurally support the one or more actuators, and one or more conduits configured to route at least one of the one or more flexible tendons from the one or more actuators to either the elevated shoulder section or the upper arm cuff; and wherein the one or more conduits further includes an upper cuff conduit extending from the one or more actuators to the upper arm cuff and a lower cuff conduit extending from the one or more actuators to the lower arm cuff, wherein the lower cuff flexible tendon is routed with the lower cuff conduit from at least one of the one or more actuators and to the upper arm cuff.

6. An upper-body apparatus comprising:

a torso garment, the torso garment comprising:
  a torso wrap, wherein the torso wrap is configured to be wrapped around a torso of a user;
  a shoulder rest connected to the torso wrap and configured to contact a shoulder of a user; and
  a yoke connected to the torso wrap and configured to extend from the torso wrap to form an open area for a head of the user to fit through and having an elevated shoulder section disposed above the shoulder rest, wherein the elevated shoulder section and the shoulder rest are configured to elevate the elevated shoulder section above both the shoulder rest and the shoulder of the user to form a gap between the elevated shoulder section and both the shoulder rest and the shoulder of the user contacting the shoulder rest;

one or more actuators, wherein each of the one or more actuators is comprised of one or more motors and the one or more motors includes a first motor;

one or more flexible tendons operationally connected to a predetermined one of the one or more actuators, wherein said one or more flexible tendons is comprised of a first flexible tendon operationally connected to the first motor and routed through or around the elevated shoulder section at one or more predetermined locations;

an upper arm cuff in operational relationship with the one or more flexible tendons, wherein the first flexible tendon extends from the elevated shoulder section to the upper arm cuff, and wherein the one or more flexible tendons are configured to effectuate shoulder movement of a user in response to the one or more actuators pulling the one or more flexible tendons to apply a force to the elevated shoulder section, and wherein the elevated shoulder section in combination with the yoke is configured to distribute the applied force away from the shoulder and towards the torso of the user;

a lower arm cuff in operational relationship with said one or more flexible tendons;

wherein the one or more flexible tendons further include a second flexible tendon, a third flexible tendon, and a fourth flexible tendon;

wherein the one or more flexible tendons include one or more proximal ends operationally connected to the one or more actuators and one or more distal ends connected to either the upper arm cuff or the lower arm cuff;

wherein at least one of the one or more flexible tendons is connected to one or more termination points on the upper arm cuff;

wherein said first flexible tendon is routed from the first motor through or around the first elevated shoulder section at a first predetermined position on the elevated shoulder section;
wherein the first flexible tendon is connected to said upper arm cuff at a first predetermined termination point;
wherein said second flexible tendon is operationally connected to said second motor and routed from the second motor through or around said first elevated shoulder section at a second predetermined position on the elevated shoulder section;
wherein the second flexible tendon is connected to said upper arm cuff at a second predetermined termination point;
wherein the third flexible tendon is routed from the third motor through or around the elevated shoulder section at a third predetermined position on the elevated shoulder section;
wherein the third flexible tendon is connected to said upper arm cuff at a third predetermined termination point;
wherein the fourth flexible tendon is routed from the fourth motor to the torso wrap at a fourth predetermined position on the torso wrap;
wherein the fourth flexible tendon is connected to said upper arm cuff at a fourth predetermined termination point;
wherein the first flexible tendon and the third flexible tendon are configured in combination to move a shoulder of said user of the upper body apparatus in a shoulder flexion movement and a shoulder extension movement; and
wherein the second flexible tendon and the fourth flexible tendon are configured in combination to move the shoulder of the user of the upper body apparatus in a shoulder abduction movement and a shoulder adduction movement.

7. An upper-body apparatus comprising:
a torso garment, the torso garment comprising:
   a torso wrap, wherein the torso wrap is configured to be wrapped around a torso of a user;
   a yoke connected to the torso wrap and configured to extend from the torso wrap to form an open area for a head of a user to fit through and having an elevated shoulder section configured to elevate the elevated shoulder section above a shoulder of the user;
one or more actuators, wherein each of said one or more actuators are comprised of one or more motors and wherein said one or more motors is comprised of a first motor;
one or more flexible tendons operationally connected to a predetermined one of the one or more actuators, wherein said one or more flexible tendons is comprised of a first flexible tendon operationally connected to the first motor and routed through or around the elevated shoulder section at one or more predetermined locations; and
an upper arm cuff in operational relationship with the one or more flexible tendons, wherein the first flexible tendon extends from the elevated shoulder section to the upper arm cuff, and wherein the one or more flexible tendons are configured to effectuate shoulder movement of a user;
one or more conduits extending from the one or more actuators and configured to route at least one of the one or more flexible tendons from the one or more actuators;
wherein the one or more conduits includes one or more shoulder section conduits extending from the one or more actuators to the elevated shoulder section, wherein the one or more conduits includes a first shoulder section conduit extending from the one or more actuators and to the elevated shoulder section;
wherein the first flexible tendon is routed with the first shoulder section conduit from at least one of the one or more actuators and to the upper arm cuff; and
wherein at least one of the one or more flexible tendons extends from the one or more shoulder section conduits and to the upper arm cuff; and
a lower arm cuff in operational relationship with the one or more flexible tendons;
wherein the one or more flexible tendons further comprises a first lower cuff flexible tendon;
wherein the one or more predetermined locations includes a routing predetermined location on the upper arm cuff;
wherein the first lower cuff flexible tendon is routed from one of the one or more actuators through or around said upper arm cuff at the routing predetermined location and to a lower arm cuff termination point on the lower arm cuff;
wherein the first lower cuff flexible tendon is connected to said lower arm cuff at a lower cuff termination point; and
wherein the one or more conduits further includes an upper cuff conduit extending from the one or more actuators to the upper arm cuff, wherein the lower cuff flexible tendon is routed with the lower cuff conduit from at least one of the one or more actuators and to the upper arm cuff.

8. The upper-body apparatus of claim 7, wherein the one or more flexible tendons further include a second flexible tendon, a third flexible tendon, and a fourth flexible tendon;
wherein said first flexible tendon and said third flexible tendon are configured in combination to move a shoulder of said user of the upper body apparatus in a shoulder flexion movement and a shoulder extension movement; and
wherein the second flexible tendon and the fourth flexible tendon are configured in combination to move the shoulder of the user of the upper body apparatus in a shoulder abduction movement and a shoulder adduction movement.

9. An upper-body apparatus comprising:
a torso garment, the torso garment comprising:
   a torso wrap, wherein the torso wrap is configured to be wrapped around a torso of a user;
   a yoke connected to the torso wrap and configured to extend from the torso wrap to form an open area for a head of a user to fit through and having an elevated shoulder section, wherein the elevated shoulder section is configured to elevate the elevated shoulder section above a shoulder of the user;
one or more actuators, wherein each of the one or more actuators is comprised of one or more motors and the one or more motors includes a first motor;
one or more flexible tendons operationally connected to a predetermined one of the one or more actuators, wherein said one or more flexible tendons is comprised of a first flexible tendon operationally connected to at least one of the one or more actuators; and
an upper arm cuff in operational relationship with the one or more flexible tendons, wherein the first flexible tendon extends from the elevated shoulder section to the upper arm cuff, and wherein a first combination of the one or more flexible tendons is configured to move a shoulder of the user of the upper body apparatus in a first degree of freedom, and wherein a second combination of the one or more flexible tendons is configured to move the shoulder of the user in a second degree of freedom.

10. The upper body apparatus of claim 9, wherein the movement of the shoulder of the user in the first degree of freedom includes movement of the shoulder in a shoulder flexion movement and a shoulder extension movement; and
   wherein the movement of the shoulder of the user in the second degree of freedom includes movement of the shoulder in a shoulder abduction movement and a shoulder adduction movement.

* * * * *